United States Patent [19]

Deming

[11] Patent Number: 4,823,264

[45] Date of Patent: Apr. 18, 1989

[54] ELECTRONIC FUNDS TRANSFER SYSTEM

[76] Inventor: Gilbert R. Deming, 7853 25th Ave., Kenosha, Wis. 53140

[21] Appl. No.: 866,759

[22] Filed: May 27, 1986

[51] Int. Cl.$^4$ ............................................. G06F 15/30
[52] U.S. Cl. ..................................... 364/408; 902/40; 902/24; 235/379
[58] Field of Search ................ 235/379, 380; 364/408; 902/24, 39, 40

[56] References Cited

U.S. PATENT DOCUMENTS

| | | | |
|---|---|---|---|
| 3,852,571 | 12/1974 | Hall | 235/379 |
| 4,270,042 | 5/1981 | Case | 235/379 |
| 4,423,316 | 12/1983 | Sano | 235/379 |

OTHER PUBLICATIONS

Lipis, Maischall, Linker, Electronic Banking, 1985, Chapter 7.

Susan Renner-Smith, Revolution in Banking, "Popular Science", Sep. 83, pp. 124–138.

Primary Examiner—Jerry Smith
Assistant Examiner—Steven Kibby

[57] ABSTRACT

The present invention relates to an electronic funds transfer system that assures that funds to be electronically transferred are actually present to be transferred. This is accomplished by sending both the debit side and the credit side of the transaction as described in automated clearing house records to a payor's financial institution or data processor and comparing both records to assure the funds are present before releasing the funds to a payee. The release of funds to a payee is accomplished by the sending of a credit by an automated clearing house record to a payee's financial institution or data processor or by the printing and mailing of a check if the payee is not a member of the automated clearing house.

3 Claims, 1 Drawing Sheet

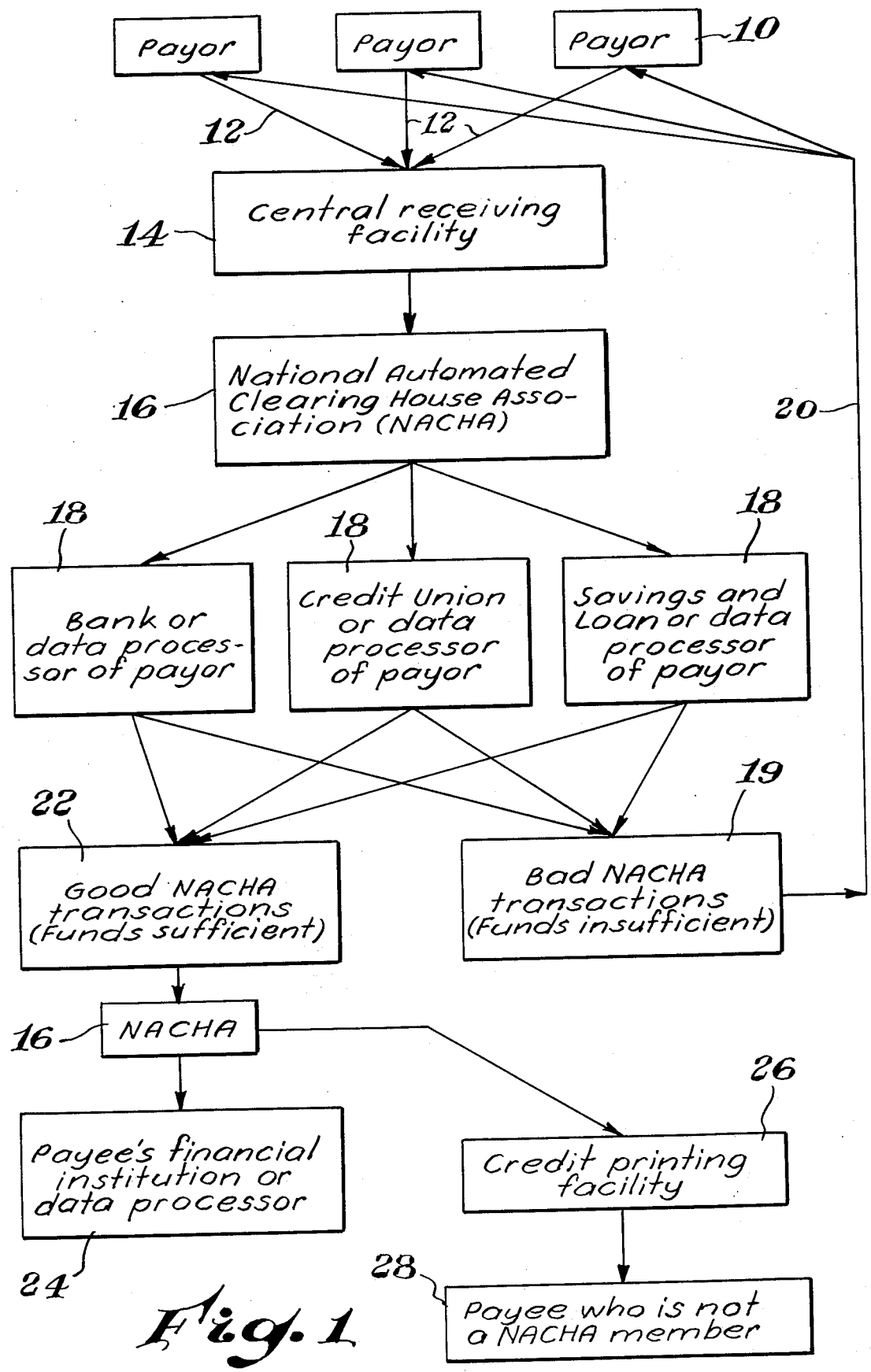

ELECTRONIC FUNDS TRANSFER SYSTEM

BACKGROUND OF THE INVENTION

This invention relates to an electronic transfer of funds system and more specifically to data processing methodology and apparatus for an improved electronic funds transfer system that assures that funds to be transferred are actually present to be transferred.

One growing area of electronic funds transfer is the use of home or personal computers to pay bills. This area is often called home banking.

One problem associated with home banking is that while it is possible for the individual user, called a payor, to connect electronically with the financial institution's computer which maintains the payor's account and request that certain bills be paid, the actual payment of payor's bills by the financial institution is a manual operation, or an electronic operation which requires a large mainframe computer.

Smaller financial institutions may not be able to participate in the area of home banking due to the high capital cost of a large mainframe computer, the associated hardware and software, and the manual operations necessary to process home banking information.

The present invention allows any size institution to participate in the electronic transfer of funds or as it is more commonly known, home banking.

SUMMARY OF THE INVENTION

The present invention is a system for the electronic transfer of funds. The system comprises a means for a payor to designate payor and payee information, including, a transaction amount payor account code is to be debited and payee account code is to be credited and a personal identification code of the payor, means to transfer payee and payor information to a central receiving facility, means for entering payee information including payee account code, payee account code destination and payor information including, payor account code, payor account code destination, payor's personal identification number and the transaction amount into a record capable of being processed by an automated clearing house, means for transmitting the record to an automated clearing house for processing and further transmission to payor account code destination, means for receiving the processed automated clearing house record at the payor account code destination, means for verifying that the transaction amount is in the payor account code and if the transaction amount is present, debiting the payor account code with the transaction amount, means for payor account code destination to then designate payee account code destination in the automated clearing house record, means for transmitting the automated clearing house record to the automated clearing house for further transmission to payee account code destination, and means for receiving the automated clearing house record at payee account code destination and crediting the payee account code with the transaction amount.

The present invention assures payor's financial institution and payee that payor has sufficient funds on deposit in payor's account to cover the transaction amount. The present invention also allows payors and their financial institutions, regardless of size, to utilize the services of an automated clearing house.

BRIEF DESCRIPTION OF THE DRAWING

FIG. 1 is a flow chart illustration of an electronic funds transfer system.

DETAILED DESCRIPTION OF THE INVENTION

Personal computers are a phenomenon that have found many varied areas of use. One area, whose use had been predicted to grow dramatically, that of the electronic transfer of funds, more popularly known as home banking, has not grown as predicted, perhaps due to a lack of assurance on the part of the person or entity being paid that such electronically transferred funds are valid, and the lack of assurance on the part of the payor's financial institution that the funds are on deposit.

The present invention is a method which will permit an individual to electronically transfer funds from the individual's account which is maintained at a financial institution to either: (a) the financial institution of the person or entity to be paid; (b) directly to the person or entity to be paid; or (c) to a credit printing facility which would generate a paper check for transmission, such as mailing, to the person or entity to be paid.

To simplify the terminology a payor is the person or entity transferring the funds out of payor's account code to pay a person or entity called a payee. Funds are moved from payor's account code, creating a debit to payor's account code and are eventually placed in payee's account code, creating a credit to payee's account code.

Using a personal computer and the method for the electronic transfer of funds of the present invention, it will be possible to make an electronic transfer of funds without being directly electronically connected, for example via a modem (modulator - demodulator) with the financial institution or data processor which maintains the payor's account code.

A payor starts by entering pertinent payor and payee information including a transaction amount for the electronic transfer of funds, from payor's account code to payee's account code, into a personal computer having a program able to accept such information.

Such payee information would include at least the location of the payee and the payee account code to which the transaction amount is to be applied. The word location means a physical location of the payee, payee's account code destination for the transaction amount, or both.

Other pertinent payor and payee information may include:
(1) a physical address and the name of the payee;
(2) a routing and transfer number (RTN) of the payee;
(3) an account number for the payor as assigned by the payee;
(4) an effective date for the transaction;
(5) a description of the transaction; and
(6) a personal identification code (or number (PIN)) assigned to the payor by payor's financial institution.

The entry of payor's personal identification code, PIN, is required payor information that must be entered by payor to prevent the unauthorized electronic transfer of funds.

The pertinent payor and payee information entered by the payor into payor's personal computer, having software able to accept and process such pertinent payor and payee information, is then transferred to a centralized receiving facility or data collector station.

This pertinent information or EFT data (Electronic Funds Transfer data) is either received at the central receiving facility and directly passed to the National Automated Clearing House Association (NACHA) or the EFT data is processed and formatted into a NACHA record that is passed to the NACHA.

The present invention requires the use of the NACHA and follows its rules and regulations. The NACHA assigns Routing and Transfer Numbers to those who utilize the NACHA.

Normally, when an NACHA record is being processed, the debit side (debit being funds removed from payor's account code) of the transaction is routed by an RTN to payor's financial institution's designated data processor. The data processor of the financial institution will then determine if there are sufficient funds to approve the transaction, called good funds, or non-sufficient funds, NSF, prompting denial of the transaction.

Also normally, when an NACHA record is being processed, the credit side (credit being funds added to payee's account code) of the transaction is routed by an RTN to payee's financial institution or the financial institution's designated date processor. Such a transaction does not assure payor's financial institution or data processor and payee's financial institution or data processor that such a transaction is good funds before the actual transaction occurs.

The present invention avoids this problem by placing a Pseudo Routing and Transfer Number (PRTN) into the position in an NACHA record normally occupied by the RTN of payee's financial institution or data processor. This PRTN is assigned to payor's financial institution or data processor and use of the PRTN causes the credit side of the transaction to be routed to payor's financial institution or date processor. At this time no funds have yet been released to the payee or payee's account code.

Other pertinent payor and payee information, such as a payee RTN, is placed in the NACHA record in a position not needed for NACHA processing, payee account code destination processing or both. Such payor and payee information is later retrieved from the NACHA record and placed or formatted into those positions needed for NACHA processing, payee account code destination or both.

The payor's financial institution or date processor now compares the debit side of the transaction with the credit side of the transaction. If there are non-sufficient funds in payor's account code the EFT transaction will be cancelled and the payor will be notified that the EFT transaction was cancelled due to insufficient funds. If there are good funds the EFT transaction will be released to the payee or payee's account code destination.

To release these funds to the payee, the RTN of the payee is now entered into the proper position into the NACHA record by payor's financial institution or data processor, so that the credit side of the transaction is routed to payee or payee's financial institution or data processor when the NACHA record is again passed or transmitted to the NACHA for processing.

If no RTN is available for payee, the RTN for a credit printing facility is substituted. Such a service will generate a paper check for mailing to the payee.

FIG. 1 illustrates one flow chart for the present invention. Payors 10 enter pertinent informatin into a computer. This pertinent information is then transferred or transmitted 12, for example via a modem, to a central receiving facility 14. The central receiving facility then passes, directly or with some processing, the pertinent payor and payee information to the NACHA 16 as an NACHA record. The NACHA then routes both the debit side and the credit side of the transactions to payor's financial institution or data processor 18. The credit and debit side of the transaction are compared to determine if payor has sufficient funds to complete and process the transaction.

If payor's funds are insufficient 19, the transaction is not allowed and payor is notified of that fact, by transmitting a message 20 to payor.

If payor's funds are sufficient 22, the transaction is allowed and the RTN of payee's financial institution or data processor is designated 24. If payee's financial institution or data processor RTN is not available, the RTN is that of a credit printing facility 26 which will then print a check ready to be mailed 28 to payee who has no NACHA designated RTN.

The above described arrangement is merely illustrative of the principles of the present invention. Numerous modifications and adaptations thereof will be readily apparent to those skilled in the art without departing from the spirit and scope of the present invention.

I claim:

1. In combination in a system for electronic transfer of funds, the system comprising means for a payor to designate payee and payor information, including a transaction amount a payor account code is to be debited and payee account code is to be credited and a personal identification code of the payor, means to transfer payee and payor information to a central receiving facility, means for entering payee information, including payee account code, payee account code destination and payor information, including payor account code, payor account code destination, payor's personal identification code and the transaction amount into a record capable of being processed by an automated clearing house, means for transmitting the record to an automated clearing house for processing and further transmission to payor account code destination, means for receiving the processed automated clearing house record at the payor account code destination, means for verifying that the transaction amount is in the payor account code and if the amount is present, debiting the payor account code with the transaction amount, means for the payor account code destination to then designate the payee account code destination in the automated clearing house record, means for transmitting the automated clearing house record to the automated clearing house for further transmission to to the payee account code destination, means for receiving the automated clearing house record at the payee account code destination and crediting the payee account code with the transaction amount.

2. A combination, as in claim 1, further comprising means for notifying payor that the transaction amount is greater than amount in payor's account code.

3. A combination, as in claim 2, further comprising means for payor account code destination to designate a credit printing facility for the printing of a credit payable to payee.

* * * * *